(12) United States Patent
Hasegawa

(10) Patent No.: US 7,882,391 B2
(45) Date of Patent: Feb. 1, 2011

(54) COMPUTER SYSTEM, CHANGEOVER-TO-BACKUP-SYSTEM METHOD, CHANGEOVER-TO-BACKUP-SYSTEM PROGRAM, MONITORING DEVICE, TERMINAL DEVICE AND BACKUP SYSTEM

(75) Inventor: Kaduhiko Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 637 days.

(21) Appl. No.: 11/882,704

(22) Filed: Aug. 3, 2007

(65) Prior Publication Data
US 2008/0082858 A1     Apr. 3, 2008

(30) Foreign Application Priority Data
Sep. 29, 2006    (JP)    ............................. 2006-268954

(51) Int. Cl.
G06F 11/00    (2006.01)
(52) U.S. Cl. ........................................... 714/13; 379/9
(58) Field of Classification Search ................... 714/13
See application file for complete search history.

(56) References Cited

U.S. PATENT DOCUMENTS

| | | | | |
|---|---|---|---|---|
| 3,908,099 A | * | 9/1975 | Borbas et al. ................... 379/9 |
| 3,920,977 A | * | 11/1975 | Karsas ........................... 714/3 |
| 4,146,749 A | * | 3/1979 | Pepping et al. ............. 370/217 |
| 4,276,451 A | * | 6/1981 | Beebe et al. ............. 379/15.05 |
| 5,996,086 A | * | 11/1999 | Delaney et al. ................. 714/4 |
| 6,005,920 A | * | 12/1999 | Fuller et al. ................. 379/9.05 |
| 6,195,760 B1 | * | 2/2001 | Chung et al. ................... 714/4 |
| 6,363,065 B1 | * | 3/2002 | Thornton et al. ............ 370/352 |
| 6,389,551 B1 | * | 5/2002 | Yount ............................. 714/4 |
| 6,704,411 B1 | * | 3/2004 | Nishidate ................ 379/265.09 |
| 6,934,880 B2 | * | 8/2005 | Hofner ......................... 714/10 |
| 7,043,665 B2 | * | 5/2006 | Kern et al. ..................... 714/5 |
| 7,072,354 B1 | * | 7/2006 | Beathard .................... 370/447 |
| 7,275,099 B2 | | 9/2007 | Suzuki |
| 2004/0066749 A1 | * | 4/2004 | Watanabe ................... 370/242 |

(Continued)

FOREIGN PATENT DOCUMENTS

GB    2 403 624 A    1/2005

(Continued)

OTHER PUBLICATIONS

"European Search Report," mailed by EPO and corresponding to European patent application No. 07 113 832.5 on May 21, 2010, 8 pages.

*Primary Examiner*—Scott T Baderman
*Assistant Examiner*—Kamini Patel
(74) *Attorney, Agent, or Firm*—Fujitsu Patent Center

(57) ABSTRACT

To aim at autonomously selecting and switching over a management system by a terminal device, and preventing the terminal device from switching over the system, managing the self-terminal, to a backup system even in the case of a temporary fault from which to recover relatively immediately and in the case of occurrence of an inconvenience (trouble) negligible enough not to be treated as the fault. Included are a terminal device 21 transmitting, a registration request (S101) to a backup system 1b, if a fault occurs in a main system 1a, and the backup system 1b not providing a management service even when receiving the registration request (S101) till a startup request (S204) made by a monitoring server 18b is received.

11 Claims, 3 Drawing Sheets

U.S. PATENT DOCUMENTS

| | | | |
|---|---|---|---|
| 2006/0142010 A1* | 6/2006 | Tom et al. | 455/445 |
| 2006/0168111 A1* | 7/2006 | Gidwani | 709/218 |
| 2006/0291400 A1* | 12/2006 | Balasaygun et al. | 370/242 |
| 2007/0116020 A1* | 5/2007 | Cheever et al. | 370/401 |
| 2007/0220323 A1* | 9/2007 | Nagata | 714/13 |

FOREIGN PATENT DOCUMENTS

| | | |
|---|---|---|
| JP | 2002-171544 | 6/2002 |
| JP | 2003-224625 | 8/2003 |
| JP | 2003-234752 | 8/2003 |
| JP | 2005-117620 | 4/2005 |

\* cited by examiner

COMPUTER SYSTEM, CHANGEOVER-TO-BACKUP-SYSTEM METHOD, CHANGEOVER-TO-BACKUP-SYSTEM PROGRAM, MONITORING DEVICE, TERMINAL DEVICE AND BACKUP SYSTEM

BACKGROUND

The present application relates to a computer system including a backup system, a changeover-to-backup-system method, a changeover-to-backup-system program, a monitoring device utilized in the computer system, a terminal device utilized in the computer system, and a backup system utilized in the computer system.

There has hitherto been a technology, as a technology for providing contact centers, using client terminals including applications corresponding to a plurality of contact centers and a function of controlling a communication conflict caused therebetween, wherein an arbitrary client terminal accepts calls corresponding to the plurality of contact centers (refer to Patent document 1).

Another technology is a technology of dualizing a server, monitoring a session with a PBX (Private Branch Exchange) within a telephone exchange system at all times, and switching over, in the case of detecting occurrence of a fault on the side of the server, the fault-occurred server with another server (refer to Patent document 2).

Still another technology is a technology of detecting states of loads of a plurality of servers connected to different VLANs (Virtual LANs) by use of a load sharing control device, and switching over the connected server in a way that translates a VID (VLAN identifier) entered in a packet sent from an information terminal according to the load state etc (refer to Patent document 3).

[Patent document 1] Japanese Patent Application Laid-Open Publication No. 2005-117620
[Patent document 2] Japanese Patent Application Laid-Open Publication No. 2002-171544
[Patent document 3] Japanese Patent Application Laid-Open Publication No. 2003-234752

SUMMARY OF DISCLOSURE

A technology of enhancing availability of a system by dualizing the system with a prepared backup system has hitherto been employed for preventing interruption of a service provided by a computer system. This type of system normally involves detecting a fault by monitoring a main system and executing a switchover process to the backup system.

A further technology is that a terminal device receiving the service from the system autonomously detects the fault, and establishes a connection to the backup system. In the system using this type of technology, even a temporary fault from which to recover relatively immediately and an inconvenience (trouble) negligible enough not to be treated as the fault might cause the terminal device to establish the connection with the backup system. As a result, the system utilized by the terminal device is distributed into a main system and a backup system, resulting in a problem of occurrence of discrepancy in state of contents of management by a management system and a problem of occurrence of discrepancy between contents of a database managed by the main system and contents of a database managed by the backup system.

Especially at a call center that receives incoming calls from customers by providing a private branch exchange (PBX) and a plurality of telephones managed by the PBX, in the case of managing contents of the incoming calls (received calls) from the same customer, there is a high necessity of managing the operation in a unified manner, resulting in a large number pf inconveniences (troubles) caused by the occurrence of the problems described above.

It is an object of the present system to, in view of the problems described above, autonomously select and switch over a management system by a terminal device, and to prevent the terminal device from switching over the system managing the self-terminal to a backup system even in the case of a temporary fault from which to recover relatively immediately and in the case of occurrence of an inconvenience (trouble) negligible enough not to be treated as the fault.

The present system has, in order to solve the problems, a terminal device transmitting, if a fault occurs in a main system, a registration request to a backup system, and the backup system that does not provide a management service even when receiving the registration request till a startup request from a monitoring device is received.

Specifically, a computer system according to an aspect of the present disclosure comprises: a terminal device; a main system providing a management service to the terminal device registered in management information; a backup system standing by for continuing to provide the management service in case of occurrence of a fault in the main system; and a monitoring device monitoring an operation status of the main system, the monitoring device including: a monitoring unit transmitting a status check to the main system and receiving a response transmitted from the main system in response to the status check, thus monitoring a normal operation of the main system; a fault detecting unit determining, if unable to receive the response to the status check under a predetermined condition, that the fault occurs in the main system; and a startup request transmitting unit transmitting, if the fault detecting unit determines that the fault occurs, a management service startup request to the backup system, the terminal device including: a registration request unit transmitting the registration request for registering in the management information to the main system or the backup system, receiving registration completed notification sent from the backup system in response to the registration request, transmitting the registration request preferentially to the main system, and transmitting, if not receiving the registration completed notification to the registration request under a predetermined condition, the registration request to the backup system, the backup system including: a management service startup Unit standing by in a status of not registering the terminal device in the management information even when receiving the registration request, starting providing the management service by starting up the management service when receiving the startup request, and starting the registration in the management information in response to the registration request. It should be noted that the predetermined condition may be set as a predetermined number or times or a predetermined period of time.

Herein, the main system is a system that provides the management service to the terminal device in a normal status, while the backup system is a system that provides the management service as a substitute for the main system if the main system gets into a status of its being disabled or difficult to provide the management service, i.e., if the fault occurs in the main system. The present system involves using the monitoring device and the terminal device as main devices for determining whether the changeover to the backup system should be done or not.

Namely, the monitoring device monitors the main system and transmits the startup request to the backup system when the fault occurs, and, in parallel with this operation, the terminal device determines through destination-of-registration selecting means whether the changeover to the backup system should be done or not and sends the registration request to the backup system.

With the configuration being provided, even in the case of a temporary fault from which to recover relatively immediately and in the case of occurrence of an inconvenience (trouble) negligible enough not to be treated as the fault, the backup system receiving none of the startup request, even when the terminal device has transmitted to the registration request to the backup system, neither makes the registration in the management information based on the registration request nor provides the management service to the terminal device. Namely, according to the present system, in such a case that the changeover to the backup system should not be done, if the terminal device happens to employ the backup system, the system of the destination of the registration according to the terminal device can be prevented from being intermingled.

Similarly, it is presumed that the monitoring device mis-determines the detection of the fault and happens to send the startup request to the backup system. Even in such a case, when the terminal device can be provided with the management service from the main system, the terminal device does not employ the backup system, and the system can be prevented from being switched over to the backup system due to the mis-determination of the monitoring device.

Further, the terminal device may be a telephone terminal used by an operator within a call center, and the main system and the backup system may be the systems, each having an exchange and a call distribution device, for providing the management service to the telephone terminal registered in the management information.

The call center has a high necessity of managing the operation in an unified manner such as managing contents of incoming calls from the same customer, and hence there is a large merit acquired by preventing the system of the destination of the registration according to the telephone terminal from being intermingled and preventing the mis-switchover to the backup system.

Further, an aspect of the present disclosure can be grasped as a method executed by a computer or as a program for making the computer function as the respective unit. Still further, an aspect of the present disclosure may also be a recording medium recorded with the program that can be read by the computer, other devices and machines. Herein, the recording medium readable by the computer etc connotes a recording medium capable of storing information such as data and programs electrically, magnetically, optically, mechanically or by chemical action, which can be read from the computer etc.

According to the present system, it is feasible to autonomously select and switch over the management system by the terminal device, and to prevent the terminal device from switching over the system managing the self-terminal to the backup system even in the case of the temporary fault from which to recover relatively immediately and in the case of the occurrence of the inconvenience (trouble) negligible enough not to be treated as the fault.

DETAILED DESCRIPTION

Embodiments of a computer system, a changeover-to-backup-system method and a changeover-to-backup-system program according to an aspect of the present disclosure, will be described with reference to the drawings.

Figure 1:
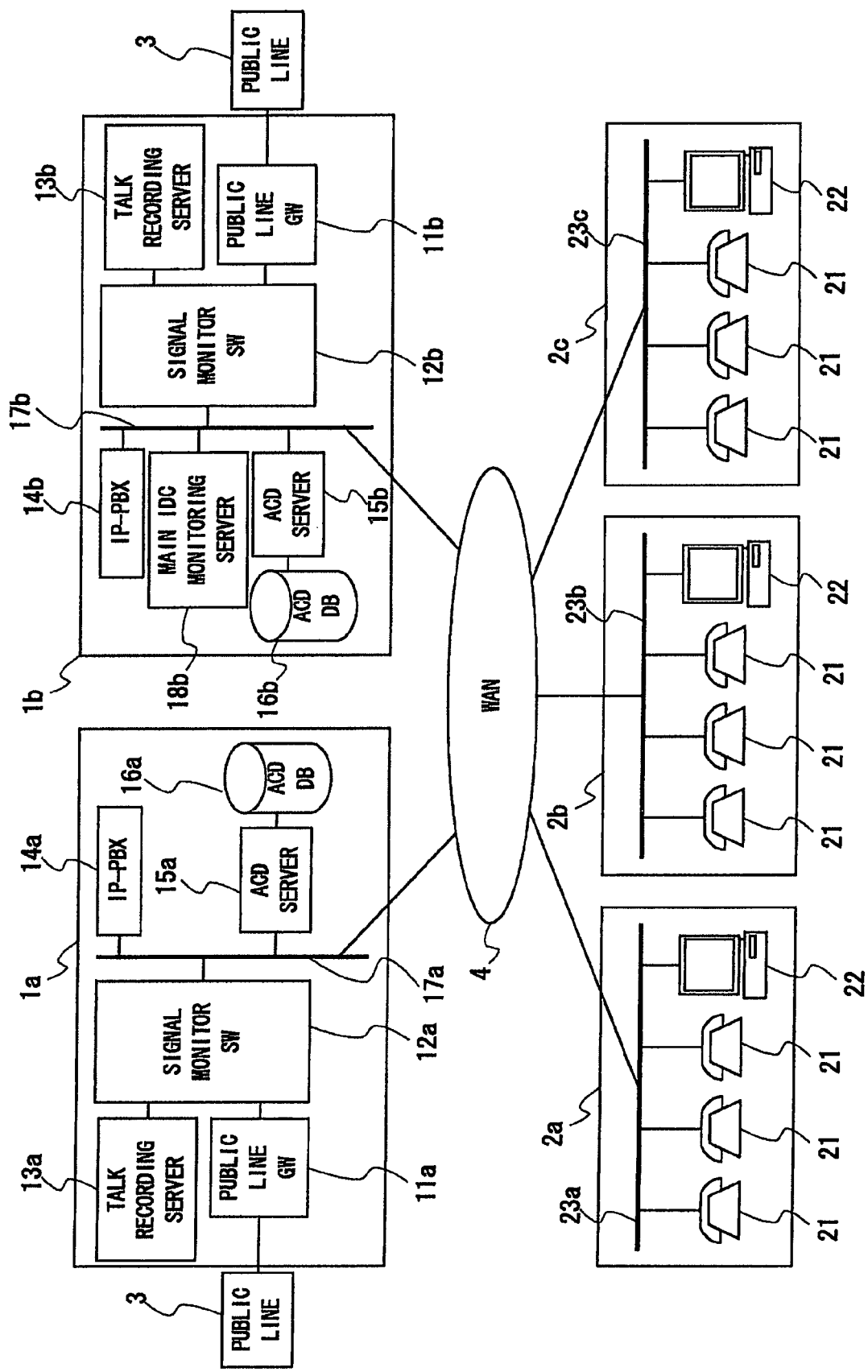
FIG. 1 is a diagram showing an outline of the whole of a call center system in an embodiment.

FIG. 1 is a diagram showing an outline of a whole call center system in the present embodiment. The call center system in the present embodiment is configured by IDCs (Internet Data Centers) 1a, 1b that receive incoming calls from a public line 3, distributing the incoming calls (received calls) to IP telephone terminals 21 operated by an operator and accumulating information utilized by the system, and call center base stations (base points) 2a, 2b, 2c connected to the IDCs 1a, 1b via a WAN (Wide Area network) 4. A plurality of call center base stations 2a, 2b, 2c exists in the present embodiment (FIG. 1 shows only three base stations, however, the number of the base stations is not limited). Further, there exist the two IDCs 1a, 1b, wherein the main IDC 1a is normally in operation, and the backup IDC 1b gets operated, though normally not in operation, when disabled to provide a call center service by use of the main IDC 1a and continues to provide the service. It is preferable that the main IDC 1a and the backup IDC 1b be installed in places situated geographically far away from each other to avoid such a situation that both of the main IDC 1a and the backup IDC 1b can not operate simultaneously due to local factors such as disasters.

The main IDC 1a is provided with a public line GW (gateway) 11a, a signal monitor switch 12a, a talk recoding server 13a, an IP-PBX (Private Branch Exchange) 14a, an ACD (Automatic Call Distributor) server 15a and an ACD DB (ACD database) 16a, which are connected to each other via a LAN (Local Area Network) 17a. FIG. 1 illustrates a bus type network as the LAN 17a, however, it may be sufficient that the respective devices described above are communication-enabled with each other, and the LAN 17a is not limited to the bus type network.

The public line GW 11a is a device that cancels a difference in communication systems between the public line 3 and the LAN 17a, and relays the received call from the public line 3. The present embodiment involves using an analog telephone network as the public line 3, however, the analog telephone network may be replaced by an IP telephone network. For example, when a talk control protocol utilized in the IP telephone network is SIP (Session Initiation Protocol) and when a telephone communication protocol utilized within the call center system is likewise the SIP, the public line GW 11a is defined as a SIP-SIP Gateway.

The signal monitor switch 12a relays packets transferred and received between the public line GW 11a and the LAN 17a, and simultaneously generates and transmits copies of the packets flowing through the signal monitor switch 12a to the talk recoding server 13a. The signal monitor switch 12a is, e.g., an L2 (Layer2) switch and is connected to a mirror port of the L2 switch.

The talk recoding server 13a restores voice information from the packets containing the voice information in the received packets, and records the restored voice information. The thus-restored voice information is recorded on an HDD (Hard Disk Drive) provided in the talk recoding server 13a in, for example, an MP3 (Motion Picture Experts Group Audio Layer 3) format.

The IP-PBX 14a is a private branch exchange for the IP telephone. The IP-PBX 14a transfers the received call relayed by the public line GW 11a to the IP telephone terminals 21 of the call center base stations 2a, 2b, 2c. On this occasion, the IP-PBX 14a, for determining which IP telephone terminal 21 the received call is transferred to, queries the ACD server 15a, and transfers the received call to the IP telephone terminal 21 of the operator designated by the ACD server 15a.

The ACD server 15a has a function of designating a destination to which the received call reaching the IP-PBX 14a is distributed. On this occasion, the ACD server 15a generates a call ID defined as a unique identifier for identifying the call, and notifies each IP telephone terminal 21 of this call ID. Simultaneously, the ACD server 15a, which is a statistic information management device, acquires various items of operation-related information concerning the communications of the IP telephone terminals 21, and accumulates, in the ACD DB 16a, as operation-related records together with the call IDs. The thus-accumulated communication information is outputted as a report. Further, when determining the received call distributing destination, this destination may be determined based on the accumulated communication information.

The backup IDC 1b has the same configuration as the main IDC 1a has. Moreover, the backup IDC 1b is provided with, in addition to the components of the main IDC 1a, a main IDC monitoring server 18b. As described above, the main IDC 1a is the IDC 1 that is normally in operation, and by contrast the backup IDC 1b is normally in a so-called cold standby status but does not provide, as the IDC 1, the service to the call center base stations 2a, 2b, 2c till the main IDC monitoring server 18b issues a system start request.

Further, ACD DBs 16a, 16b provided in the main IDC 1a and the backup IDC 1b normally undergo mirroring to each other. Hence, the ACD DBs 16a, 16b retain the same contents at all times.

The call center base stations 2a, 2b, 2c are provided with the IP telephone terminals 21 and ACD monitor/report output terminals 22, which are connected to each other via LANs 23a, 23b, 23c. The LANs 23a, 23b, 23c are not limited to the bus type network as in the case of the LAN 17a.

The IP telephone terminal 21 is the device that receives the received call distributed by the IP-PBX 14a and performs talking with a customer. The operator logs in on the IP-PBX 14a with an operator ID assigned to the self-operator by use of the IP telephone terminal 21 employed by the self-operator. Hence, the IP-PBX 14a gets capable of grasping which operator uses the IP telephone terminal 21 and which IP telephone terminal 21 is used by this operator. Further, the operator performs talking via a telephone receiver of the IP telephone terminal 21, and can utilize functions such as call hold and escalation by pressing a hold button, an escalation button, etc provided in the IP telephone terminal 21. The IP telephone terminal 21 transmits an event notifying packet to the IP-PBX 14a for every event that the operator presses the button. The IP-PBX 14a receives this event notifying packet and provides a call-hold service, an escalation service, etc. For instance, when receiving a call-hold event notifying packet, the IP-PBX 14a gets a call-hold tone heard by the customer in a way that transmits the packet containing tone information of the call-hold tone to the public line GW 11a.

Further, the IP telephone terminal 21 registers the self-terminal in the IP-PBX 14a of the main IDC 1a or in the IP-PBX 14b of the backup IDC 1b, and is thus managed by the IP-PBX 14a or the IP-PBX 14b. Namely, the IP-PBX 14a or the IP-PBX 14b registers the IP telephone terminal 21 of which making a registration to the self IP-PBX, on the management table, and makes management such as distributing the calls. Herein, the IP telephone terminal 21 has a registration priority table in which IP addresses and priorities of the registration destination IP-PBX 14a and IP-PBX 14b are previously set. In the present embodiment, the IP address of the IP-PBX 14a of the main IDC 1a is set in a head record of the registration priority table, and the IP address of the IP-PBX 14b of the backup IDC 1b is set in a next record. Namely, the IP telephone terminal 21 requests normally the IP-PBX 14a of the main IDC 1a for its registration.

The ACD monitor/report output terminal 22 is a terminal for browsing the communication information accumulated in the ACD DB 16a by the ACD server 15a, and includes a keyboard, a mouse, etc as input devices and a display, a printer, etc as output devices (of which illustrations are omitted). The ACD monitor/report output terminal 22 transmits a report output request to the ACD server 15a through the operator's manipulation, and outputs a report transmitted for the ACD server 15a in response to this request. A variety of output formats such as displaying to the display, and outputting a print and a file, can be selected.

It is to be noted that the public line GW 11a, the signal monitor switch 12a, the talk recoding server 13a, the IP-PBX 14a, the ACD server 15a, the ACD DB 16a, the main IDC monitoring server 18b, the IP telephone terminal 21 and the ACD monitor/report output terminal 22, are computers each including a CPU (Central Processing Unit), a main storage device (main memory) such as a RAM (Random Access Memory), an auxiliary storage device (sub-memory) such as an HDD (Hard Disk Drive) or an EEPROM (Electrically Erasable and Programmable Read Only Memory), and a network interface such as a NIC (Network Interface Card). The signal monitor switch 12a may not, however, include the storage devices.

Figure 2:
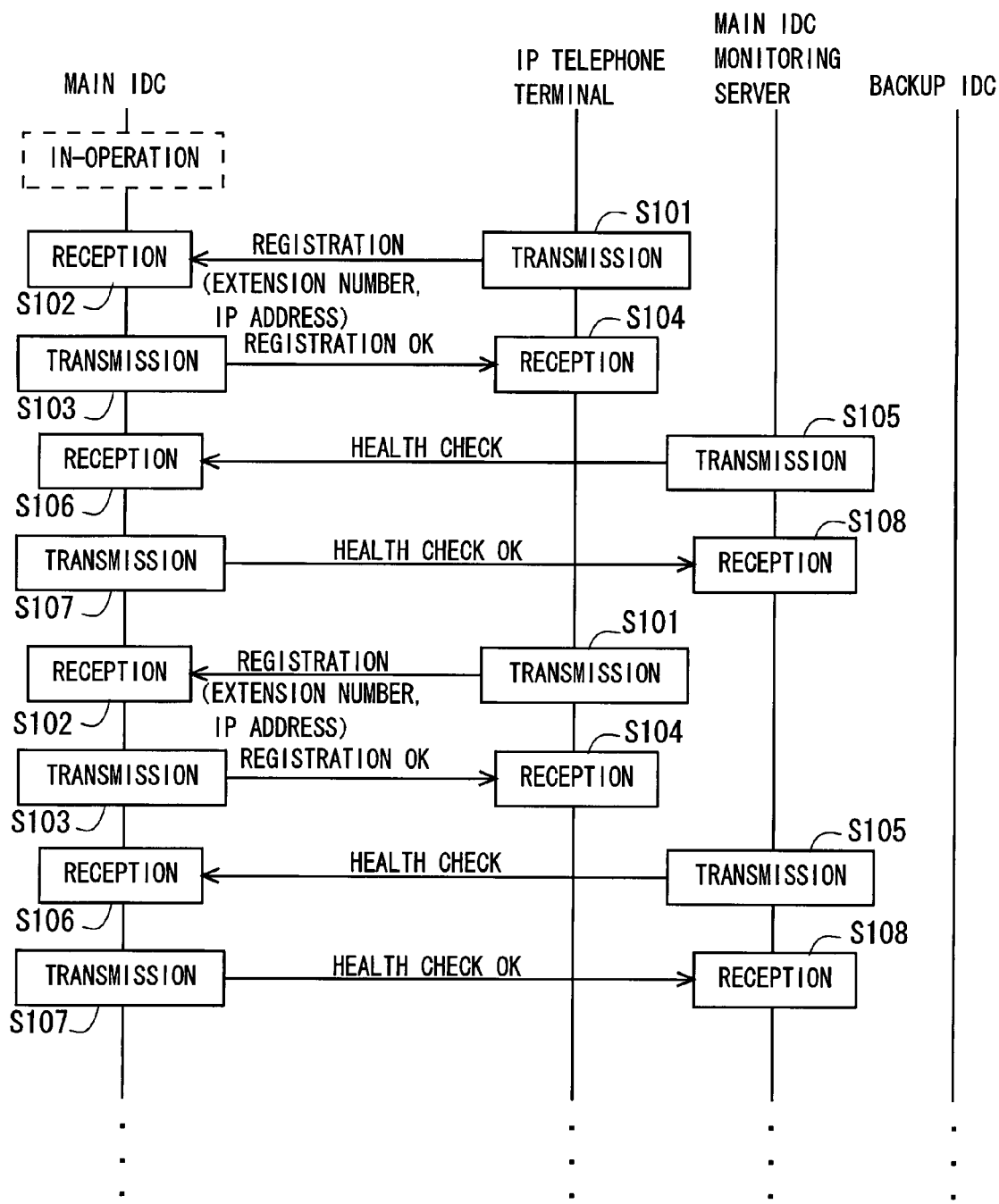
FIG. 2 is a sequence diagram showing a flow of a main IDC monitoring process in the embodiment.

FIG. 2 is a sequence diagram showing a flow of a main IDC monitoring process in the present embodiment. The process shown in this sequence diagram is periodically started by the IP telephone terminal and the main IDC monitoring server, and is controlled by the CPUs provided in the IP telephone terminal 21, the main IDC monitoring server 18a and the IP-PBX 14a.

In step S101, the IP telephone terminal 21 sends a Registration packet (corresponding to a registration request according to an aspect of the present disclosure). The Registration packet connotes a packet that is transmitted when the IP telephone terminal 21 requests the IP-PBX 14a to register the self-existence, and contains an extension number and an IP address assigned to the IP telephone terminal as items of information. The Registration packet is periodically transmitted by the IP telephone terminal 21. Thereafter, the processing proceeds to step S102.

In step S102, the IP-PBX 14a receives the Registration packet. The IP-PBX 14a receives the Registration packet addressed to the self IP-PBX from the IP telephone terminal 21, and registers, in the management table, the extension number and the IP address extracted from the received packet. At this time, if this request is the registration request give from the already-registered IP telephone terminal 21, contents registered in the management table are updated. Thereafter, the processing proceeds to step S103.

In step S103, the IP-PBX 14a sends a Registration OK packet (corresponding to registration completed notification according to an aspect of the present disclosure). The IP-PBX 14a transmits the Registration OK packet notifying that the registration in or the update of the management table has been done according to the Registration packet received from the IP telephone terminal 21, to the sender IP telephone terminal 21 of the Registration packet. Thereafter, the processing advances to step S104.

In step S104, the IP telephone terminal 21 receives the Registration OK packet. The IP telephone terminal itself is registered in the management table of the IP-PBX 14a by its receiving the Registration OK packet sent by the IP-PBX 14a in step S103, thereby confirming that the IP telephone terminal is set under the management of the IP-PBX 14a. The process starting with step S101 and ending with step S104 is started periodically by the IP telephone terminal 21. Namely, the IP telephone terminal 21 monitors through a series of steps (the process) described above whether the main IDC 1a is in a service providable status or not.

In step S105, the main IDC monitoring server 18a sends a Health Check packet (corresponding to a status check according to an aspect of the present disclosure). The Health Check packet connotes a packet transmitted for the main IDC monitoring server 18a to monitor whether the main IDC 1a is in the service providable status or not. The Health Check packet is transmitted periodically (at an interval of, e.g., 3 min) by the main IDC monitoring server 18a. Thereafter, the processing proceeds to step S106.

In step S106, the IP-PBX 14a receives the Health Check packet. Thereafter, the processing advances to step S107.

In step S107, the IP-PBX 14a sends a Health Check OK packet. The IP-PBX 14a transmits, to the main IDC monitoring server 18a, the Health Check OK packet notifying that the Health Check packet sent from the main IDC monitoring server 18a has been normally received and that the main IDC 1a is in the service providable status. Thereafter, the processing proceeds to step S108.

In step S108, the main IDC monitoring server 18a receives the Health Check OK packet. The main IDC monitoring server 18a receives the Health Check OK packet sent by the IP-PBX 14a in step S107, thereby confirming that the main IDC 1a is in the service providable status. The process from step S105 up to step S108 is started periodically (at the interval of e.g., 3 min) by the main IDC monitoring server 18a. Namely, the main IDC monitoring server 18a monitors through a series of steps (the process) described above whether the main IDC 1a is in the service providable status or not.

While the main IDC 1a remains in the service providable status of the call center service, it follows that the main IDC monitoring process shown in FIG. 2 is periodically repeated. Namely, the main IDC 1a is monitored by both of the IP telephone terminal 21 and the main IDC monitoring server 18a.

Figure 3:
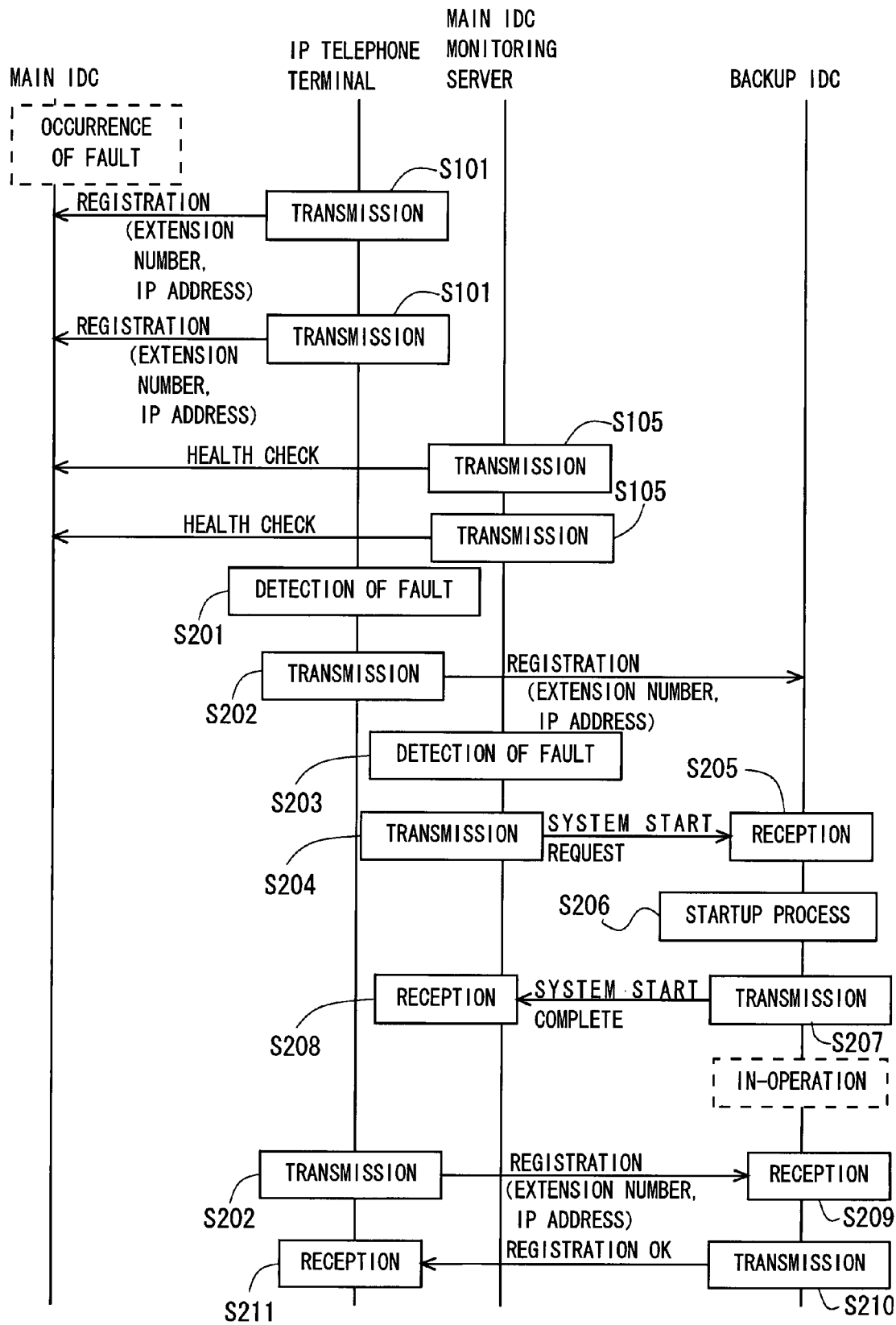
FIG. 3 is a sequence diagram showing a flow of an IDC switchover process when a fault occurs in the embodiment.

FIG. 3 is a sequence diagram showing an IDC switchover process when a fault occurs according to the present embodiment. The process shown in this sequence diagram is started by the IP telephone terminal and the main IDC monitoring server that detect the fault, and is controlled by the CPUs provided in IP telephone terminal 21, the main IDC monitoring server 18a and the IP-PBXs 14a, 14b.

As described above, the IP telephone terminal 21 periodically transmits the Registration packet to the IP-PBX 14a of the main IDC 1a (step S101). At this time, if the fault occurs in the main IDC 1a, the IP telephone terminal 21 is unable to receive the Registration OK packet that must have been sent from the IP-PBX 14a. Herein, the fault in the main IDC 1a shall embrace a variety of faults such as a fault in the IP-PBX 14a, a fault in the WAN 4 that connects the main IDC 1a to the call center base stations 2a, 2b, 2c, and a fault in the LAN 17a of the main IDC 1a.

In step S201, the fault is detected. The IP telephone terminal 21, if unable to confirm the reception of the Registration OK packet from the IP-PBX 14a a predetermined number of times or for a predetermined period of time (e.g., if unable to receive the Registration OK packets consecutively three times with respect to the Registration packets transmitted at the interval of 3 min), determines that some sort of fault occurs in the main IDC 1a and that the service of the main IDC 1a can not be utilized. Thereafter, the processing proceeds to step S202.

In step S202, the IP telephone terminal 21 transmits the Registration packet. Herein, a destination of the Registration packet is the IP-PBX 14b of the backup IDC 1b. Namely, the IP telephone terminal 21 determines in step S201 that the service of the main IDC 1a can not be utilized, and requests the IP-PBX 14b of the backup IDC 1b, which is set second in the registration priority table, to register the existence of the self-terminal.

Normally, the system of the backup IDC 1b is, however, as explained above, in the so-called cold standby status but does not provide, as the IDC 1, any service to the call center base stations 2a, 2b, 2c till a system start request based on the main IDC monitoring server 18a is issued. Namely, the IP telephone terminal 21 can not receive the Registration OK packet from the IP-PBX 14b and fails to execute the registration process in the IP-PBX 14b of the backup IDC 1b. This scheme prevents occurrence of discrepancy in content of the management by the IP-PBXs 14a, 14b or by the ACD server and occurrence of discrepancy in content of the ACD DB due to the switchover to the backup IDC 1b by a certain IP telephone terminal 21 in case of prompt recovery though just a very temporary communication fault occurs in the WAN between the call center base stations 2a, 2b, 2c and the main IDC 1a and in case of the packet being simply delayed and discarded.

Given next is an explanation of a flow of the IDC switchover process executed by a main IDC monitoring server 18b when the fault occurs. As described above, the main IDC monitoring server 18b periodically transmits the Health Check packet to the IP-PBX 14a of the main IDC 1a (step S105). At this time, if the fault occurs in the main IDC 1a, the main IDC monitoring server 18b can not receive the Health Check OK packet that must have been sent from the IP-PBX 14a.

In step S203, the fault is detected. The main IDC monitoring server 18b, if unable to confirm the reception of the Health Check OK packet from the IP-PBX 14a a predetermined number of times or for a predetermined period of time (e.g., if unable to receive the Health Check OK packet consecutively three times with respect to the Health Check packet transmitted at the interval of 3 min), determines that some sort of fault occurs in the main IDC 1a and that the service is required to be provided by the backup IDC 1b. Thereafter, the processing proceeds to step S204.

In step S204, a System Start request packet is transmitted. The main IDC monitoring server 18b determines that the fault occurs in the main IDC 1a and that the main IDC 1a is in a service unprovidable status, and therefore sends a packet for requesting a start of providing the service to the respective components (the IP-PBX 14b, the ACD server 15b, etc) of the backup IDC 1b. Thereafter, the processing proceeds to step S205.

In step S205, the System Start request packet is received. Each of the components of the backup IDC 1b receives the System Start request packet. Thereafter, the processing proceeds to step S206.

In step S206, a startup process is executed. Each of the components of the backup IDC 1b, which have received the System Start request packet, executes the startup process of the process (service) required for providing the call center service, thereby setting the backup IDC 1b in the service providable status. Thereafter, the processing advances to step S207.

In step S207, a System Start completed notification packet is transmitted. Each of the components of the backup IDC 1b, which have executed the startup process in step S206, sends the System Start completed notification packet for notifying of completion of the startup process to the main IDC monitoring server 18b. Thereafter, the processing proceeds to step S208.

In step S208, the System Start completed notification packet is received. The main IDC monitoring server 18b receives the System Start completed notification packet from each of the components of the backup IDC 1b, thereby confirming that the backup IDC 1b has got into the service providable status. Namely, from this step onward, the backup IDC 1b provides the service to the respective call center base stations 2a, 2b, 2c.

At a point of time when the backup IDC 1b has got into the service providable status, however, there exist neither the IP telephone terminals 21 registered in the management table of the IP-PBX 14b of the backup IDC 1b nor the IP telephone terminals 21 receiving the management service from the backup IDC 1b. Herein, when the IP telephone terminal 21 detecting the fault of the main IDC 1a (refer to step S201) transmits the Registration packet to the IP-PBX 14b of the backup IDC 1b (refer to step S202), the Registration packet is received by the IP-PBX 14b that has completed the startup process (refer to step S209). Thereafter, the IP-PBX 14b registers the extension number and the IP address extracted from the received packet in the management table, and transmits the Registration OK packet to the IP telephone terminal 21 (refer to step S210). This transmitted Registration OK packet is received by the IP telephone terminal 21 (refer to step S211), and the changeover to the backup IDC 1b from the main IDC 1a of the IP telephone terminal is thus completed. The process executed in steps S202, S209, S210 and S211 is the same as the process executed in steps S101 through S104 shown in FIG. 2.

Namely, according to the present embodiment, the IP telephone terminal 21 is enabled to autonomously select and switch over the IP-PBX and can be prevented from switching over the IP-PBX managing the self-terminal to the backup system even in the case of the temporary fault from which to recover relatively immediately and in the case of the occurrence of the packet delay, the packet discard, etc that are not treated as the faults.

Moreover, the reliability on the whole system is further enhanced by dualizing all the configuration of the main IDC 1a, and an aspect of the present disclosure can be also applied to this dualized configuration. In the case of the call, the IP addresses are set in the registration priority table in the sequence such as the IP-PBX of the main IDC 1a, the IP-PBX of the main IDC 1a and the IP-PBX of the backup IDC 1b.

While the present disclosure has been described in detail with reference to preferred embodiments thereof, it will be apparent to one skilled in the art that various changes can be made, and equivalents employed, without departing from the scope of the invention. Each of the aforementioned documents, including the foreign priority document, JP 2006-268954 filed on 29 Sep., 2006 is incorporated by reference herein in its entirety.

What is claimed is:

1. A computer system comprising: a terminal device; a main system to provide a management service to said terminal device registered in management information; a backup system to stand by for continuing to provide the management service in case of occurrence of a fault in the main system; and a monitoring device to monitor an operation status of said main system, said monitoring device including:
    a monitoring unit to transmit a status check to said main system and to receive a response transmitted from said main system in response to the status check, thus monitoring a normal operation of said main system;
    a fault detecting unit to determine, if unable to receive the response to the status check under a predetermined condition, that the fault occurs in said main system; and
    a startup request transmitting unit to transmit, if said fault detecting unit determines that the fault occurs, a management service startup request to said backup system, said terminal device including:
    a registration request unit to transmit the registration request for registering in the management information to said main system or said backup system, to receive registration completed notification sent from said backup system in response to the registration request, to transmit the registration request to said main system, and to transmit, if not receiving the registration completed notification to the registration request under a predetermined condition, the registration request to said backup system, said backup system including:
    a management service startup unit to stand by in a status of not registering said terminal device in the management information even when receiving the registration request, to start providing the management service by starting up the management service when receiving the startup request, and to start the registration in the management information in response to the registration request.

2. A computer system according to claim 1, wherein the predetermined condition is a predetermined number of times or a predetermined period of time.

3. A computer system according to claim 1, wherein said terminal device is a telephone terminal used by an operator within a call center, and
    said main system and said backup system are the systems, each having an exchange and a call distribution device, for providing the management service to said telephone terminal registered in the management information.

4. A changeover-to-backup-system method in a computer system comprising: a terminal device; a main system to provide a management service to said terminal device registered in management information; a backup system to stand by for continuing to provide the management service in case of occurrence of a fault in the main system; and a monitoring device to monitor an operation status of said main system, said monitoring device executing:
    transmitting a status check to said main system and receiving a response transmitted from said main system in response to the status check, thus monitoring a normal operation of said main system;
    determining, if unable to receive the response to the status check under a predetermined condition, that the fault occurs in said main system; and transmitting, if it is determined in said fault detecting step that the fault occurs, a management service startup request to said backup system, said terminal device executing:

transmitting the registration request for registering in the management information to said main system or said backup system, receiving registration completed notification sent from said backup system in response to the registration request, transmitting the registration request preferentially to said main system, and transmitting, if not receiving the registration completed notification to the registration request under a predetermined condition, the registration request to said backup system, said backup system executing:

standing by in a status of not registering said terminal device in the management information even when receiving the registration request, starting to provide the management service by starting up the management service when receiving the startup request, and starting the registration in the management information in response to the registration request.

5. A changeover-to-backup-system method according to claim 4, wherein the predetermined condition is a predetermined number of times or a predetermined period of time.

6. A changeover-to-backup-system method according to claim 4, wherein said terminal device is a telephone terminal used by an operator within a call center, and said main system and said backup system are the systems, each having an exchange and a call distribution device, for providing the management service to said telephone terminal registered in the management information.

7. A readable-by-computer recording medium recorded with a changeover-to-backup-system program making, in a computer system according to claim 1, said monitoring device function as:

a monitoring unit to transmit a status check to said main system and receiving a response transmitted from said main system in response to the status check, thus monitoring a normal operation of said main system;

a fault detecting unit to determine, if unable to receive the response to the status check under a predetermined condition, that the fault occurs in said main system; and a startup request transmitting unit to determine, if said fault detecting unit determines that the fault occurs, a management service startup request to said backup system.

8. A readable-by-computer recording medium recorded with a changeover-to-backup-system program making, in a computer system according to claim 1, said terminal device function as:

a registration request unit to transmit the registration request for registering in the management information to said main system or said backup system, to receive registration completed notification sent from said backup system in response to the registration request, to transmit the registration request preferentially to said main system, and to transmit, if not receiving the registration completed notification to the registration request under a predetermined condition, the registration request to said backup system.

9. A readable-by-computer recording medium recorded with a changeover-to-backup-system program making, in a computer system according to claim 1, said backup system function as:

a management service startup unit to stand by in a status of not registering said terminal device in the management information even when receiving the registration request, to start providing the management service by starting up the management service when receiving the startup request, and to start the registration in the management information in response to the registration request.

10. A terminal device utilized in a computer system comprising: a main system to provide a management service to a terminal device registered in management information; a backup system to stand by for continuing to provide the management service in case of occurrence of a fault in the main system; and a monitoring device to monitor an operation status of said main system, said terminal device comprising:

a transmitting unit to transmit a registration request for registering in the management information to said main system;

a request unit to transmit, if unable to receive registration completed notification to the registration request with respect to said main system under a predetermined condition, the registration request to said backup system; and a receiving unit to receive, from said backup system that initially stands by in a status of not registering said terminal device, a registration completed notification only after the backup system receives a management service startup request indicating a fault detection at said main system from a management service startup unit.

11. A backup system to provide a management service in case of occurrence of a fault in a main system in a computer system comprising:

said main system to provide the management service to a terminal device registered in management information; and a monitoring device to monitor an operation status of said main system, said backup system comprising:

a receiving unit to receive the registration request from said terminal device; and a management service startup unit to stand by in a status of not registering said terminal device in the management information even when receiving the registration request from said terminal device, to start providing the management service by starting up the management service when receiving the startup request from said monitoring device, and to start the registration in the management information in response to the registration request.

* * * * *